United States Patent [19]
Penton et al.

[11] Patent Number: 4,602,048
[45] Date of Patent: Jul. 22, 1986

[54] ARYLOXY-ALKOXY-ALLYLPHENOXY SUBSTITUTED POLYPHOSPHAZENES

[75] Inventors: Harold R. Penton, Prairieville; F. Alexander Pettigrew, Baton Rouge, both of La.

[73] Assignee: Ethyl Corporation, Richmond, Va.

[21] Appl. No.: 799,942

[22] Filed: Nov. 20, 1985

Related U.S. Application Data

[63] Continuation of Ser. No. 683,022, Dec. 18, 1984.

[51] Int. Cl.[4] .............................................. C08J 9/10
[52] U.S. Cl. ....................................... 521/82; 521/95; 521/180; 521/189
[58] Field of Search ................... 521/180, 189, 82, 95

[56] References Cited

U.S. PATENT DOCUMENTS

| | | | |
|---|---|---|---|
| 3,994,838 | 11/1976 | Thompson et al. | 521/189 |
| 4,076,658 | 2/1978 | Dieck et al. | 521/189 |
| 4,083,820 | 4/1978 | Dieck et al. | 521/189 |
| 4,107,108 | 8/1978 | Dieck et al. | 521/189 |
| 4,113,670 | 9/1978 | Dieck et al. | 521/189 |
| 4,116,891 | 9/1978 | Dieck et al. | 521/189 |

Primary Examiner—Morton Foelak
Attorney, Agent, or Firm—Donald L. Johnson; John F. Sieberth; Joseph D. Odenweller

[57] ABSTRACT

Polyphosphazene elastomers for use in making low density foam comprising a $\{P<=N\}_\pi$ substantially linear backbone randomly substituted with 20–80 mole percent phenoxy, 20–80 mole percent lower alkylphenoxy, 1–50 mole percent alkoxy and 0.5–20 mole percent alkenylphenoxy and the foamed products made therefrom.

24 Claims, No Drawings

ARYLOXY-ALKOXY-ALLYLPHENOXY SUBSTITUTED POLYPHOSPHAZENES

This application is a continuation of application Ser. No. 683,022, filed Dec. 18, 1984.

BACKGROUND OF THE INVENTION

Polyphosphazenes are polymers containing a plurality of $+P<=N+$ groups wherein substituents are bonded to phosphorus. The polyphosphazenes which are the concern of this invention are high molecular weight linear polyphosphazenes containing 50 or more of the above units and having molecular weights from about 10,000 up to 5,000,000 or higher. They are substantially linear and have little if any cross-linking. In general, they are soluble in benzene, toluene, cyclohexane, and tetrahydrofuran and are relatively insoluble in linear aliphatic hydrocarbons such as hexane or heptane. Groups substituted on phosphorus include phenoxy, alkylphenoxy, alkoxy and alkenylphenoxy (e.g. o-allylphenoxy) and the like.

Cellular plastics have been available for many years. One of the first of such materials was cellular rubber dating to the 1910-1920 period. Subsequently cellular compositions were made from latex, phenol-formaldehyde resins, urea-formaldehyde resins, PVC, polyurethane, cellulose acetate, polystyrene, polyethylene, epoxies, ABS resins, silicones and very recently polyphosphazenes. Polyphosphazene foams have very desirable properties in that they are highly fire resistant and when subject to direct flame do not produce toxic smoke which is encountered with many other common foamed materials, notably polyurethanes.

Methods of making cellular polyphosphazenes are known. Various procedures are described in U.S. Pat. No. 4,026,838; U.S. Pat. No. 4,055,520; U.S. Pat. No. 4,055,523; U.S. Pat. No. 4,107,108; U.S. Pat. No. 4,189,413 and others. In general, the foams are made by mixing the polyphosphazene gum, a blowing agent and a peroxide or sulfur-type curing agent and heating the blended components to activate the blowing agent and cure the resultant foam.

Polyphosphazene copolymers which are substituted with both alkoxy and aryloxy substituents in the ratio of 4:1 to 2:3 are described in Reynard et al U.S. Pat. No. 3,856,712. Peroxide and sulfur cured fluoroalkoxy-substituted polyphosphazenes containing alkenylphenoxy substituents are described in Kyker et al U.S. Pat. No. 3,970,533. The amount of alkenylphenoxy ranges from 0.02 mole percent when using a peroxide cure to a maximum of 6 mole percent when using a sulfur cure. Aryloxy and alkoxy substituted polyphosphazenes which have 0.1-5 mole percent alkenylphenoxy substituents and are sulfur curable are described in Cheng U.S. Pat. No. 4,116,785.

SUMMARY OF THE INVENTION

It has now been discovered that low density polyphosphazene foam can be made from polyphosphazene gums which are substituted with phenoxy, alkylphenoxy, alkoxy and alkenylphenoxy substituents. In the absence of the alkenylphenoxy groups, a foam would not form.

DESCRIPTION OF THE PREFERRED EMBODIMENTS

A preferred embodiment of the invention is a cured polyphosphazene foam having a density below about 6 pounds per cubic foot said foam comprising about 10-60 weight percent inorganic filler and about 20-50 weight percent of a cured polyphosphazene elastomer which has a $+P<=N+_n$ backbone in which n has an average value of about 100-1,000,000 or more and the phosphorus substituent prior to cure comprise about 20-80 mole percent phenoxy, 20-80 mole percent lower alkylphenoxy, 1-50 mole percent alkoxy and 0.5-20 mole percent alkenylphenoxy and said substituents are randomly distributed along said backbone.

In a more preferred embodiment the polyphosphazene gum contains about 30-70 mole percent phenoxy, 30-70 mole percent lower alkylphenoxy, 5-50 percent alkoxy and 6-15 mole percent alkenylphenoxy substituents. In a still more preferred embodiment the substituents are 35-60 mole percent phenoxy, 35-60 mole percent lower alkylphenoxy, 7-23 mole percent alkoxy and 7-12 mole percent alkenylphenoxy.

The preferred alkylphenoxy groups are those in which the alkyl is a lower alkyl, that is an alkyl containing about 1-4 carbon atoms. The preferred alkyl substituent is ethyl. The more preferred alkylphenoxy groups are the p-alkylphenoxy groups. The most preferred alkylphenoxy group is p-ethylphenoxy.

Although any alkoxy substituent can be used, the preferred alkoxy substituents are those which contain about 1-8 carbon atoms such as methoxy, ethoxy, propoxy, butoxy, isobutoxy, n-pentoxy, isopentoxy, n-hexoxy, 2-ethylhexoxy and the like including mixtures thereof.

Useful alkenylphenoxy substituents include any phenoxy substituent having an olefinically unsaturated aliphatic side chain. Of these, the more preferred substituents are the allylphenoxy substituents. Of these, the most preferred substituent is o-allylphenoxy.

The high molecular weight substantially linear polyphosphazenes of the invention are made by the proper substitution of a substantially linear polyphosphonitrilic chloride. These in turn are made by the reaction of a stoichiometric excess of ammonium chloride with phosphorus pentachloride in an inert solvent such as monochlorobenzene at about 120°-130° C. This produces a mixture of cyclic phosphonitrilic chloride that is about 90% trimer. The trimer is purified by crystallization or distillation or both and the purified trimer is polymerized by heating in a sealed vessel under vacuum or an inert atmosphere at about 220°-250° C. for about 8-24 hours. Preferably a small amount of catalyst such as is described in U.S. Pat. No. 4,123,503 or U.S. Pat. No. 4,226,840 is included. The linear polymer is then recovered by dissolving in a solvent such as cyclohexane, toluene or tetrahydrofuran followed by precipitation by addition of a non-solvent such as heptane. Low molecular weight oligomer and trimer will remain in solution. The coagulated linear polyphosphonitrilic chloride is then substituted by reacting a solution of the polyphosphonitrilic chloride with a solution of sodium aryloxides and alkoxides containing the proper ratio of phenoxide, alkylphenoxide, alkoxide and alkenylphenoxide. Tetrahydrofuran (THF) is a preferred solvent. In a more preferred embodiment, the sodium alkenylphenoxide is reacted first with a THF solution of the polyphosphonitrilic chloride at 50°-150° C. and then a THF solution of the sodium phenoxide, alkylphenoxide and alkoxide is added and reacted to complete the substitution.

The ratio of each substituent can be controlled by using the proper number of equivalents of each aryloxide and alkoxide. For example, if the polyphosphonitrilic chloride solution contains 100 equivalents of replacable chlorine, then the solution should be reacted with about 20–80 equivalents of sodium phenoxide, 20–80 equivalents of sodium alkylphenoxide, 1–50 equivalents of sodium alkoxide and 0.5–20 equivalents of sodium alkenylphenoxide selected such that the total number of equivalents is about 100–110.

The solution is then neutralized with an acid such as sulfuric acid. It is then poured into aqueous isopropanol to coagulate the gum. The gum is purified by re-dissolving in tetrahydrofuran and again coagulated by pouring into methanol. The substituted polyphosphazene precipitates in the form of white crumbs and is separated and dried under vacuum.

The following examples show the preparation of polyphosphazene gums both with and without alkenylphenoxy substituents.

EXAMPLE 1

This example shows the preparation of a polyphosphazene gum having phenoxy, alkylphenoxy and alkoxy substituents but without alkenylphenoxy substituents. This gum is outside the present claims.

In a reaction vessel was placed 685.7 grams of a 16.9 weight percent solution of a high molecular weight linear polyphosphonitrilic chloride having a limiting viscosity number (LVN) of 0.65. The solution contained 115.89 grams of the polyphosphonitrilic chloride which represented 2.0 equivalents of Cl. An additional 320 grams of tetrahydrofuran (THF) was used to rinse the polymer into the reaction vessel. In a separate vessel was placed 75.9 grams of a THF/cyclohexane solution containing 120 milliequivalents (meq) of sodium phenoxide, 729.7 grams of a THF/cyclohexane solution containing 540 meq of sodium phenoxide and 540 meq of sodium p-ethylphenoxide and 450.4 grams of a n-butanol solution containing 1000 meq of sodium n-butoxide. The resultant aryloxide/alkoxide solution was added rapidly to the stirred polyphosphonitrilic chloride solution. The temperature rose from 25° C. to 46° C. The vessel was sealed and pressurized with nitrogen to 50 psig and heated to 150° C. After 16 hours the vessel was cooled and the contents removed. A 50 ml aqueous solution containing 9.8 grams of $H_2SO_4$ was added to the mixture with stirring. A clear solution containing a white precipitate resulted. The mixture was centrifuged and the clear liquid poured into 3 volumes of a 90:10 isopropanol/water solution which had been acidified with $H_2SO_4$ to pH 1.0. The substituted polyphosphazene precipitated and was separated. The precipitate was then dissolved in 2 liters of THF. This solution was poured into 2.5 volumes of methanol causing the substituted polymer to precipitate in the form of polymer crumb. The crumb was removed and washed with methanol and then vacuum dried at 50° C. overnight yielding 188 grams of dry polyphosphazene. Analysis by $^{31}$P-NMR showed 52.5 mole percent aryloxide substitution and 47.5 mole percent butoxy substitution. The polymer had a glass transition temperature (Tg) of −61° C.

EXAMPLE 2

This example shows the preparation of a high molecular weight linear polyphosphazene substituted with phenoxy, p-ethylphenoxy, butoxy and o-allylphenoxy groups according to the present invention.

In a stainless steel pressure reaction vessel was placed 685.7 grams of a 16.9 weight percent solution of linear high molecular weight polyphosphonitrilic chloride (LVN 0.65). This solution contained 115.89 grams of polyphosphonitrilic chloride which represented 2000 meq of replacable Cl. Following this, 95.9 grams of a THF/cyclohexane solution of sodium o-allylphenoxide was added. This represented 140 meq of o-allylphenoxide. The stirred mixture was heated to 70° C. and held at that temperature for 1 hour. In a separate vessel was placed 67.1 grams of a THF/cyclohexane solution containing 106 meq of sodium phenoxide, 644.6 grams of a THF/cyclohexane solution containing 477 meq of sodium phenoxide and 477 meq of sodium p-ethylphenoxide and 456.6 grams of a n-butanol solution containing 1000 meq of sodium n-butoxide. The stainless steel reactor was cooled to 60° C. and the above combined THF solution was added rapidly to the reactor and rinsed in with an additional 150 grams of THF. The reactor was sealed and pressurized to 50 psig with nitrogen and heated to 150° C. After 16 hours the reactor was cooled and the contents removed and neutralized with 50 mls of an aqueous solution containing 9.8 grams of $H_2SO_4$. An additional 75 ml of water was added and the mixture was centrifuged to remove salt crystals. The liquid was poured slowly into 3 volumes of a 90:10 isopropanol/water solution which had been acidified to pH 1.0 with $H_2SO_4$. The polymer precipitated and was washed with methanol and then dissolved in 2 liters of THF. The THF polymer solution was slightly cloudy so it was centrifuged to remove a small amount of salt. The solution was poured into 2.5 volumes of methanol which coagulated the substituted polyphosphazene as a white crumb. The white crumb was dried under vacuum. Analysis by $^{31}$P-NMR showed 52.4 mole percent aryloxide and 47.6 mole percent butoxide. O-allylphenoxide content was 7 mole percent. The Tg was −60° C.

The polyphosphazene gum is most useful in making foamed compositions. Thus another embodiment of the invention is a cured polyphosphazene foam having a density below about 6 pounds per cubic foot said foam comprising about 10–65 weight percent inorganic filler and about 20–50 weight percent of a cured polyphosphazene elastomer which has a $+P<=N\}_{\overline{n}}$ backbone in which n has an average value of about 100–1,000,000 or more and the phosphorus substituents prior to cure comprise about 20–80 mole percent phenoxy, 20–80 mole percent lower alkylphenoxy, 1–50 mole percent alkoxy and 0.5–20 mole percent alkenylphenoxy and said substituents are randomly distributed along said backbone.

In making a polyphosphazene foam, the gum is first blended with other components which include inorganic fillers, blowing agents and curing agents. Accordingly, another embodiment of the invention is a foamable curable polyphosphazene composition comprising (a) a substantially linear polyphosphazene elastomer having the structure $+P<=N\}_{\overline{n}}$ in which n has an average value of about 100–1,000,000 or more and the phosphorus substituents comprise about 20–80 mole percent phenoxy, 20–80 mole percent lower alkylphenoxy, 1–50 mole percent alkoxy and 0.5–20 mole percent alkenylphenoxy and said substituents are randomly distributed along said backbone, (b) an inorganic filler, (c) a blowing agent and (d) a curing agent.

An essential component of the formulation is a blowing agent. The amount of blowing agent should be that which will evolve sufficient gas to give a foam of the desired density but not an excessive amount which results in splitting of the foam. Blowing agents decompose to evolve gas upon heating. This decomposition temperature varies over a wide range with different foaming agents. Many foaming agents are azo compounds which evolve nitrogen when undergoing thermal decomposition. Examples of blowing agents includes dinitrosopentamethylenetetramine, 4,4'-oxybis-(benzenesulfonyl hydrazide), azodicarbonamide, ammonium carbonate, ammonium bicarbonate, sodium bicarbonate, ammonium nitrite, tert-butylamine nitrite, guanidine nitrite, guanylurea nitrite, sodium borohydride, potassium borohydride, urea, biuret, N-nitro urea, diazoaminobenzene, 2,2'-azobis(2-methylpropionitrile), 2,2'-azobis, isobutyronitrile, 1,1'-azobiscyclohexanecarbonitrile, azobisisobutyramidoxime, azobisformamide, N,N'-ditert-butylazobisformamide, N,N'-diphenylazobisformamide, phenylhydrazine, benzylmonohydrozone, benzenesulfonyl hydrazide, methyl carbanilate, 4,4'-oxybis(benzenesulfonyl hydrazide), 3,3'-sulfonyl-bis(-benzenesulfonyl hydrazide), cyanuric trihydrazide, 4,4'-oxybis(benzenesulfonyl semi-carbizide), benzoylazide, p-tert-butylbenzoylazide, diphenyl-4,4'-disulfonyldiazide, N,N'-dimethyl-N,N'-dinitroso terephthalamide and the like.

Curing agents encompass a broad range of compounds which serve to promote cross-linking of the polyphosphazene. One class of curing agents is made up of peroxides. The most important curing agent used to make the present foamed compositions are the sulfur-type curing agents generally referred to as vulcanizing systems. A typical sulfur vulcanizing system comprises sulfur, an accelerator and promoters. Zinc oxide is usually included with the sulfur. Other accelerators include zinc dialkyldithiocarbamates (e.g., zinc dimethyldithiocarbamate, zinc dibutyldithiocarbamate and the like). Other useful accelerators are zinc benzothiazylsulfide, N-cyclohexyl-2-benzothiazylsulfenamide, 4,4'-dithiomorpholine, fatty acids in combination with zinc oxide such as stearic acid, zinc fatty acid salts such as zinc stearate, tetraalkylthiuram monosulfide, tetraalkylthiuram disulfide, 2-benzothiazoyl disulfide, zinc benzothiazolyl mercaptide, mercaptobenzothiazole, 2-benzothiazolylsulfenamide, amines, diphenyl guanidine, thiobisamines and the like.

Another component that is usually included in polymer foam compositions is a filler. These are usually inorganic materials although some organic materials are used. Examples of fillers are clay, talc, mica, asbestos, feldspar, bentonite, wollastonite, fullers earth, pumice, pyrophillite, rottenstone, slate flour, vermiculite, calcium silicate, magnesium silicate, alumina, hydrated alumina, antimony oxide, magnesia, titania, zinc oxide, silica, calcium carbonate, barium carbonate, magnesium carbonate, barium sulfate, calcium sulfate, lime, magnesium hydroxide, carbon black, graphite, metal powders, fibers and whiskers, barium ferrite, magnetite, molybdenum disulfide, glass fibers or flakes, ground glass and the like.

The polyphosphazene formulations which are foamed according to the present invention generally include a plasticizer. These can be liquids which when blended with the polyphosphazene gum and the other components tend to reduce the viscosity of the mass and assist in making a homogenous blend. Useful platicizers include tricresylphosphate, triphenylphosphate, cresyldiphenylphosphate, butyl octyl phthalate, dibutyl phthalate, dicyclohexyl phthalate, diisodecyl phthalate, di-2-ethylhexyl phthalate, ditridecyl phthalate, isooctylisodecyl phthalate, diisodecyl adipate, di-2-ethylhexyl adipate, octyldecyl adipate, diisobutyl adipate, diisooctyl adipate, di-2-ethylhexyl azelate, diisodecyl azelate, dibutyl maleate, glycerol ricinoleate, isopropyl myristate, isopropyl palmitate, butyl oleate, glycerol trioleate, methyl oleate, 2-ethylhexyl oleate, dibutyl sebacate, di-2-ethylhexyl sebacate, butyl stearate, 2-ethylhexyl stearate, triethyleneglycol dicaprate, ethylene glycol terephthalate polyesters, diethylene glycol dipelargonate, polyethylene glycol 200 dibenzoate, polyethylene glycol 600 dibenzoate, glycerol triacetylricinoleate, adipic acid glycol polyester 6,000 and the like.

The amount of the different components in the formulation can vary widely based upon parts by weight per 100 parts by weight of polyphosphazene gum. A useful range is given in the following table:

|  | Parts by Weight |
| --- | --- |
| Polyphosphazene gum | 100 |
| Sulfur | 5–20 |
| Accelerator | 0.1–5 |
| Blowing agent | 10–50 |
| Filler | 50–300 |
| Plasticizer | 5–50 |

The components in the formulated composition are then subjected to mechanical mixing or mastication to form a substantially uniform blend. This mixing is conducted in the same type equipment used in compounding rubber prior to vulcanization. Suitable mixing equipment on the laboratory scale is marketed under the trademark "Brabender". Larger mixing equipment is marketed under the "Banbury" trademark. These are heavy duty mixers that crush and masticate the formulation until it forms a homogenous blend.

After the mixing operation, the composition is shaped into the desired form such as slabs for use in insulation or cushions. It can also be extruded into hollow cylindrical forms for use as pipe insulation.

The shaped composition can then be aged at a temperature above the pre-determined maximum mixing temperature but below the activation temperature of the blowing agent. This operation causes a limited amount of cross-linking to occur raising the viscosity of the composition such that the blowing gas does not escape during the blowing operation. This step is usually done in a pre-cure oven. Good results have been achieved when the shaped composition is maintained at a pre-cure temperature of about 100°–120° C. for a period of about 5–20 minutes.

In the next operation, the shaped pre-cure composition is heated in an unconfined environment to a temperature high enough to activate the blowing agent. The composition then expands forming a cellular polyphosphazene article. The term "unconfined environment" means that there is space available into which the shaped polyphosphazene composition can expand during cell development. As it reaches its final volume it may again be confined in some form or mold.

The gums made in Examples 1 and 2 were subjected to foaming operations. The following formulation was used:

|  | Parts by weight |
| --- | --- |
| Polyphosphazene gum | 35.0 |
| Hydral 710[1] | 65.4 |
| Zinc stearate | 3.6 |
| Silastic HA-2[2] | 3.45 |
| Carbowax 3350[3] | 0.72 |
| Celogen AZ 130[4] | 9.1 |
| Titanium oxide[5] | 2.8 |
| Plasticizer[6] | 3.6 |

[1]Alcoa brand hydrated alumina
[2]Dow-Corning brand silicon filled methyl vinyl silicone
[3]Union Carbide brand polyethyleneoxide
[4]Naugatuck brand azodicarbonamide
[5]Pigment grade
[6]An oil made by substituting trimer with phenoxy, p-ethyl-phenoxy, and o-allyl-phenoxy groups The components were blended in a Brabender mixer for 9 minutes at 60 rpm.

A curing concentrate was separately formulated as follows.

|  | Parts by weight |
| --- | --- |
| Polyphosphazene gum[1] | 100 |
| Sulfur | 175 |
| Hydral 710 | 10 |
| Silastic HA-2 | 10 |
| Vanax 552[2] | 50 |
| Methyl Zimate[3] | 12.5 |
| Butyl Zimate[4] | 12.5 |
| Water | 7.5 |

[1]A poly(aryloxy) phosphazene containing 4.2 mole percent o-allylphenoxy
[2]Vanderbilt brand piperidinium pentamethylene dithiocarbamate
[3]Vanderbilt brand zinc dimethyldithiocarbamate
[4]Vanderbilt brand zinc dibutyldithiocarbamate The above concentrate was mixed in a Brabender at low speed and then in a 2-roll mill. It was then cut into small pellets and the pellets were stored in a refrigerator.

Finally, the first formulation above was placed on one roll of a 2-roll mill and 6.6 parts by weight of the concentrate pellets were randomly dropped into the nip of the 2-roll mill as the blend rotated on one roll. The blend was then cut from the roll and was homogenized by 40 passes through the mill with folding after each pass. Then 23 gram portions of fully formulated gum were placed in a mold in a pre-cure oven at 230° F. for 40 minutes. The pre-cured gum was then placed in a foaming oven at 350° F. for 30 minutes. The results obtained with the polyphosphazene gums from Examples 1 and 2 are shown in the following table.

|  | Example 1 | Example 2 |
| --- | --- | --- |
| Foam quality | No foam | Good |
| Density (lbs/ft³) | — | 3.7 |
| % Open cell[1] | — | 50 |
| Compression resistance[2] | — | 1.2 |
| Compression set (%)[3] | — | 21.39 |
| Water absorbance (g/ft²)[4] | — | 37.6 |

[1]ASTM D2856
[2]ASTM D1056
[3]ASTM D1667
[4]MIL-P-15280H

As these results show, the formulation in which the gum contained phenoxy, p-ethylphenoxy and n-butoxy substituents did not form a foam whereas the gum containing phenoxy, p-ethylphenoxy, n-butoxy and o-allylphenoxy formed a high quality low density foam.

We claim:

1. A cured polyphosphazene foam having a density below about 6 pounds per cubic foot said foam comprising about 10–65 weight percent inorganic filler and about 20–50 weight percent of a cured polyphosphazene elastomer which has a $\pm P<=N\pm_n$ backbone in which n has an average value of about 100–1,000,000 or more and the substituents bonded directly to phosphorus comprise about 20–80 mole percent phenoxy, 20–80 mole percent lower alkylphenoxy, 1–50 mole percent alkoxy and 0.5–20 mole percent alkenylphenoxy and said substituents are randomly distributed along said backbone.

2. A polyphosphazene foam of claim 1 wherein said alkenylphenoxy is o-allylphenoxy.

3. A foam composition of claim 2 wherein said alkoxy substituent contains about 1–8 carbon atoms.

4. A foam composition of claim 3 wherein said lower-alkylphenoxy substituent is mainly a para-lower-alkylphenoxy substituent.

5. A foam composition of claim 4 wherein said para-lower-alkylphenoxy substituent is mainly p-ethylphenoxy.

6. A foam composition of claim 5 wherein the amount of o-allylphenoxy substituent is about 6–15 mole percent.

7. A foamable curable polyphosphazene composition comprising (a) a substantially linear polyphosphazene elastomer having the structure $\pm P<=N\pm_n$ in which n has an average value of about 100–1,000,000 or more and the substituents bonded directly to phosphorus comprise about 20–80 mole percent phenoxy, 20–80 mole percent lower alkylphenoxy, 1–50 mole percent alkoxy and 0.5–20 mole percent alkenylphenoxy and said substituents are randomly distributed along said backbone, (b) an inorganic filler, (c) a blowing agent and (d) a curing agent.

8. A polyphosphazene composition of claim 7 wherein said alkenylphenoxy substituent is o-allylphenoxy.

9. A polyphosphazene composition of claim 8 wherein said alkyl substituent contains about 1–8 carbon atoms.

10. A polyphosphazene composition of claim 9 wherein said lower-alkylphenoxy is mainly a para-lower-alkylphenoxy.

11. A polyphosphazene composition of claim 10 wherein said para-lower-alkylphenoxy is mainly p-ethylphenoxy.

12. A polyphosphazene composition of claim 11 wherein the amount of o-allylphenoxy substituent is about 6–15 mole percent.

13. A polyphosphazene composition of claim 7 wherein said curing agent is a sulfur-based vulcanizing system.

14. A polyphosphazene composition of claim 13 wherein said alkenylphenoxy substituent is o-allylphenoxy.

15. A polyphosphazene composition of claim 14 wherein said alkoxy substituents contain about 1–8 carbon atoms.

16. A polyphosphazene composition of claim 15 wherein said lower-alkylphenoxy substituent is mainly a para-lower-alkylphenoxy substituent.

17. A polyphosphazene composition of claim 16 wherein said para-lower-alkylphenoxy substituent is p-ethylphenoxy.

18. A polyphosphazene composition of claim 17 wherein the amount of o-allylphenoxy substituent is about 6–15 mole percent.

19. A polyphosphazene elastomer suitable for use in making a low density polyphosphazene foam, said elastomer having a substantially linear $-[P\!\!<\!\!=\!\!N]_{\overline{n}}$-backbone in which n has an average value of about 100–1,000,000 or more and the substituents bonded directly to phosphorus comprise about 20–80 mole percent phenoxy, 20–80 mole percent lower alkylphenoxy, 1–50 mole percent alkoxy and 0.5–20 mole percent alkenylphenoxy and said substituents are randomly distributed along said backbone.

20. An elastomer of claim 19 wherein said alkenylphenoxy is o-allylphenoxy.

21. An elastomer of claim 20 wherein said alkoxy substituents contain about 1–8 carbon atoms.

22. An elastomer of claim 21 wherein said lower-alkylphenoxy is mainly para-lower-alkylphenoxy.

23. An elastomer of claim 22 wherein said para-lower-alkylphenoxy is mainly p-ethylphenoxy.

24. An elastomer of claim 23 wherein the amount of o-allylphenol substituents is about 6–15 mole percent.

* * * * *

UNITED STATES PATENT AND TRADEMARK OFFICE
CERTIFICATE OF CORRECTION

PATENT NO.  : 4,602,048

DATED       : JULY 22, 1986

INVENTOR(S) : HAROLD R. PENTON, ET AL.

It is certified that error appears in the above-identified patent and that said Letters Patent is hereby corrected as shown below:

Column 2, line 18, reads "5-50 percent" and should read -- 5-50 mole percent --.

Signed and Sealed this

Seventh Day of October, 1986

[SEAL]

Attest:

DONALD J. QUIGG

Attesting Officer

Commissioner of Patents and Trademarks